United States Patent
Park

(10) Patent No.: US 7,483,355 B2
(45) Date of Patent: Jan. 27, 2009

(54) WRITE-ONCE OPTICAL DISC, AND METHOD AND APPARATUS FOR RECORDING/REPRODUCING DATA ON/FROM THE OPTICAL DISC

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 650 days.

(21) Appl. No.: 10/967,142

(22) Filed: Oct. 19, 2004

(65) Prior Publication Data

US 2005/0083815 A1 Apr. 21, 2005

(30) Foreign Application Priority Data

Oct. 20, 2003 (KR) .................. 10-2003-0073136

(51) Int. Cl.
G11B 5/09 (2006.01)
(52) U.S. Cl. .............. 369/53.15; 369/47.14; 369/53.16; 369/53.17; 714/5
(58) Field of Classification Search .............. 369/53.15, 369/47.14; 714/5
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A * | 4/1995 | Ito et al. .................. 714/719 |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |
| 5,495,466 A | 2/1996 | Dohmeier et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

Primary Examiner—Tan X Dinh
Assistant Examiner—Linh T Nguyen
(74) Attorney, Agent, or Firm—Birch, Stewart, Kolasch & Birch, LLP

(57) ABSTRACT

A write-once recording medium structure and an apparatus and method for recording final management information on the recording medium, are provided. The recording medium includes a temporary defect management area (TDMA) and a defect management area (DMA). The method includes transferring information recorded in the TDMA to the DMA of the recording medium and recording the transferred information in the DMA as final management information. The final management information includes at least one defect list and either space bit map information or sequential recording range information. The position information on one or all valid defect lists is recorded in the DMA.

31 Claims, 12 Drawing Sheets

U.S. PATENT DOCUMENTS

| | | |
|---|---|---|
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 | 8/2003 | Ijtsma et al. |
| 6,615,363 B1 * | 9/2003 | Fukasawa ..................... 714/5 |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 | 2/2006 | Takahashi et al. |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 * | 9/2003 | Shau ........................ 257/758 |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 * | 4/2004 | Hwang et al. ............ 369/53.21 |
| 2004/0105363 A1 * | 6/2004 | Ko et al. .................. 369/47.14 |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 * | 9/2004 | Lee et al. ................. 369/47.14 |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |

| | | | |
|---|---|---|---|
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0 997 904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1152414 A2 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065 A0 | 6/2005 |
| EP | 1564740 A1 | 8/2005 |
| EP | 1573723 A0 | 9/2005 |
| EP | 1612790 A1 | 1/2006 |
| EP | 1623422 A0 | 2/2006 |
| GB | 2356735 A | 5/2001 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 1020040094301 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004/015180 | 9/2004 |
| WO | WO-2004/075180 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

* cited by examiner

WRITE-ONCE OPTICAL DISC, AND METHOD AND APPARATUS FOR RECORDING/REPRODUCING DATA ON/FROM THE OPTICAL DISC

This application claims the priority benefit of Patent Application No. 10-2003-0073136 filed on Oct. 20, 2003 in Republic of Korea. The entire contents of this Korean application are hereby incorporated by reference.

BACKGROUND OF THE INVENTION

1. Field of the Invention

The present invention relates to a write-once optical disc and a method and apparatus for recording/reproducing data on/from the write-once optical disc, and more particularly, to a method and apparatus for recording final management information in a defect management area of the write-once disc and a method and apparatus for utilizing the same to perform recording/reproducing for the write-once optical disc.

2. Discussion of the Related Art

As an optical recording medium, optical discs on which high-capacity data can be recorded are widely being used. Among them, a new high-density optical recording medium (HD-DVD), for example, a Blu-ray disc, has been recently developed for recording and storing high-definition video data and high-quality audio data for a long term period.

The Blu-ray disc is the next generation HD-DVD technology and the next generation optical recording solution, and has an excellent capability to store data more than the existing DVDs. Recently, a technical specification of international standard for HD-DVD has been established.

Related with this, various standards for a write-once Blu-ray disc (BD-WO) are being prepared following the standards for a rewritable Blu-ray disc (BD-RE).

FIG. 1 schematically illustrates the structure of a recording area of a rewritable BD-RE. The BD-RE shown in FIG. 1 is a single layer disc having one recording layer. The disc includes from the inner periphery thereof a lead-in area, a data area and a lead-out area. The data area is provided with an inner spare area (ISA0) and an outer spare area (OSA0) respectively disposed at the inner and outer peripheries to replace defective areas on the disc, and a user data area for recording user data therein and provided between the spare areas.

As data is recorded on the rewritable blue-ray disc (BD-RE), if there exists a defective area in the user data area, data recorded in the defective area is transferred to and recorded in a portion of the spare area such as the ISA0 or OSA0. This portion of the spare area is also known as a replacement area. Additionally, the position information of the defective area and the position information of the corresponding replacement area are recorded in defect management areas (DMA1~DMA4) provided in the lead-in/out areas to perform defect management. The BD-RE has a cluster as a minimal recording part recorded thereon. One cluster is composed of total 32 sectors, and one sector is composed of 2048 bytes. In particular, the BD-RE allocates and uses 32 clusters as the defect management area (DMA).

Since rewriting of data can be performed in any area of the rewritable disc, the entire area of the disc can be used randomly irrespective of the specific recording manner. Also, since the defect management information can be written, erased and rewritten repeatedly even in the defect management areas (DMAs), it does not matter even though only a small size of the defect management area is provided.

FIG. 2 illustrates the structure of a DMA in the BD-RE of FIG. 1. Each of the DMA1 through DMA4 has the structure shown in FIG. 2. In this regard, defect management information stored in the DMA1 is recorded also in each of the other DMAs (DMA2, DMA3 and DMA4) so that this information is not lost and is available even if one of the DMAs becomes defective.

As shown in FIG. 2, in the rewritable single layer disc (BD-RE), one DMA is composed of total 32 clusters. Four heading clusters (Cluster 1~Cluster 4) of the DMA are provided as an area in which disc definition structure (DDS) information is repeatedly recorded four times, one cluster for one DDS. Remaining Clusters 5 to 32 are provided as an area in which a defect list (DFL) is recorded seven times, four clusters for one DFL.

A variety of information required for disc management is recorded in the DDS, which includes position information (Pointer DFL, hereinafter referred to as "P_DFL") for informing a position of a valid DFL. Accordingly, in case that a recording/reproducing apparatus intends to record and manage the defective area of the disc as the DFL, the DFL is recorded at a $1^{st}$ position of DFL (Cluster 5 to Cluster 8) of the DMA, and the position information (P_DFL) on the DFL is recorded in the DDS. Hereafter, if a new DFL is to be recorded, the new DFL is overwritten at the $1^{st}$ position of DFL (Cluster 5 to Cluster 8).

However, in case that the above procedure is continuously performed, the $1^{st}$ position of DFL (area in which the DFL is recorded) may become a damaged area. At this time, the new DFL is recorded at a valid $2^{nd}$ position of DFL (Cluster 9 to Cluster 12) of the DMA, and the position information on this new DFL (New P_DFL) is recorded in the DDS. Accordingly, $3^{rd}$ to $7^{th}$ positions of DFLs (Cluster 13 to Cluster 32) of the DMA first remain to be in the unrecorded state in which recording has not yet been made, and then are sequentially recorded with the next new DFL. For instance, if the $2^{nd}$ position of DFL is damaged, the DFL is newly recorded at the $3^{rd}$ position of DFL (Cluster 13 to Cluster 16), and the position information on this new DFL (New P_DFL) is recorded in the DDS.

FIG. 3 illustrates the structure of a dual layer BD-RE having two recording layers (Layers 0 and 1). The disc has four DMAs (DMA1~DMA4) each having total 64 clusters. Two DMA parts in the Layers 0 and 1 constitute one DMA. For instance, the DMA 1 is composed of the two DMA parts ("DMA1" and "DMA1") in the Layers 0 and 1.

FIG. 4 illustrates the structure of each defect management area of the dual layer BD-RE of FIG. 3. As in the single layer BD-RE, the same information is recorded in each DMA, and each DMA includes a DDS recorded in each of Clusters 1~4, a reserved area at Clusters 5~8, and Clusters 9~64 for recording the DFLs. In the dual layer disc of FIG. 4, recording is made on the basis of the same concept as that of the recording method of the single layer DMA of FIG. 2, but differs in that one DFL is recorded with 8 clusters (e.g., Clusters 9 to 16) and that the reserved area is provided between the DDS (Clusters 1 to 4) and the DFL (Clusters 9 to 64). Clusters 9 to 64 are provided as an area in which the DFL is recorded for seven times, 8 clusters for one DFL recording.

In the above rewritable disc, overwriting can be made in any one of the recording areas of the disc such that a recording manner is not much limited. However, in a write-once disc, since writing can be made only once on any area on the disc, the recording manner is not only much limited, but also the defect management becomes an important matter especially when data is recorded on a high-density write-once disc such as a BD-WO.

Accordingly, there is a need for a method of recording and managing defect management information in a write-once optical disc such as a BD-WO, which takes into consideration the characteristics of the disc such as the write-once characteristic. Further, a case in which recording can be performed on the disc should be generally distinguished from a "final" case in which recording is no longer performed. And in such cases, a method of recording and managing the defect management information is needed.

Since any currently published regulation on the existing write-once optical discs (e.g., CD-R, DVD-R) does not address a case in which the defect management is performed, a new unified regulation on defect management for the new write-once optical discs is urgently needed to address the above-mentioned requirements associated with the disc.

SUMMARY OF THE INVENTION

Accordingly, the present invention is directed to a write-once optical disc, and a method and apparatus for recording final management information on the optical disc, which substantially obviate one or more problems due to limitations and disadvantages of the related art.

An object of the present invention is to provide a write-once optical disc structure for efficiently performing defect management.

Another object of the present invention is to provide a method for recording final management information in a defect management area when data is no longer recorded on a write-once optical disc, e.g., when the optical disc is finalized.

A further another object of the present invention is to provide a recording and reproducing method for an optical disc, which vary depending on whether or not the optical disc is finalized.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present invention, there is provided a method for recording final management information on a write-once recording medium, the recording medium including a temporary defect management area (TDMA) and a defect management area (DMA), the method comprising: transferring information recorded in the TDMA to the DMA of the recording medium; and recording the transferred information in the DMA as final management information, the final management information including at least one defect list and either space bit map information or sequential recording range information, wherein the recording step includes storing, in the DMA, position information on one valid defect list from the at least one defect list recorded in the DMA.

According to another aspect of the present invention, there is provided a method for recording final management information on a write-once recording medium, the recording medium including a temporary defect management area (TDMA) and a defect management area (DMA), the method comprising: transferring information recorded in the TDMA to the DMA of the recording medium; and recording the transferred information in the DMA as final management information, the final management information including a plurality of duplicated defect lists and either space bit map information or sequential recording range information, wherein the recording step includes storing, in the DMA, position information on all valid defect lists from the duplicated defect lists recorded in the DMA.

According to another aspect of the present invention, there is provided a write-once recording medium comprising: at least one recording layer; and a temporary defect management area (TDMA) and a defect management area (DMA) on the at least one recording layer, wherein information recorded in the TDMA is transferred and recorded to the DMA as part of final management information, and the final management information includes at least one defect list, either space bit map information or sequential recording range information, and position information on one valid defect list from the at least one defect list recorded in the DMA.

According to another aspect of the present invention, there is provided a write-once recording medium comprising: at least one recording layer; and a temporary defect management area (TDMA) and a defect management area (DMA) on the at least one recording layer, wherein information recorded in the TDMA is transferred and recorded to the DMA as part of final management information, and the final management information includes a plurality of duplicated defect lists, either space bit map information or sequential recording range information, and position information on all valid defect lists from the duplicated defect lists recorded in the DMA.

According to another aspect of the present invention, there is provided an apparatus for recording final management information on a write-once recording medium, the recording medium including a temporary defect management area (TDMA) and a defect management area (DMA), the apparatus comprising: a recording/reproducing unit; and a controller controlling the recording/reproducing unit for transferring information recorded in the TDMA to the DMA of the recording medium, and recording the transferred information in the DMA as part of final management information, wherein the final management information includes at least one defect list, either space bit map information or sequential recording range information, and position information on one valid defect list from the at least one defect list recorded in the DMA.

According to another aspect of the present invention, there is provided an apparatus for recording final management information on a write-once recording medium, the recording medium including a temporary defect management area (TDMA) and a defect management area (DMA), the apparatus comprising: a recording/reproducing unit; and a controller controlling the recording/reproducing unit for transferring information recorded in the TDMA to the DMA of the recording medium, and recording the transferred information in the DMA as part of final management information, wherein the final management information includes a plurality of duplicated defect lists, either space bit map information or sequential recording range information, and position information on all valid defect lists from the duplicated defect lists recorded in the DMA.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

For description convenience, a write-once optical disc is exemplified as a Blu-ray disc write-once (BD-WO).

The terminology of the present invention employs generally popularized terms if possible. However, in a specific case, terms are arbitrarily selected by the inventor(s). In this case, If the meanings of the terms are defined in detail in the corresponding descriptions, it is understood that the invention should be understood with the defined meanings of the terms, not just in view of the simple names of the terms.

The write-once optical disc according to the present invention not only includes a spare area for defect management, but also includes a temporary disc management area (TDMA) for recording management information therein before the disc is finalized, and a defect management area (DMA) for recording final management information therein when the disc is finalized.

Figure 5:
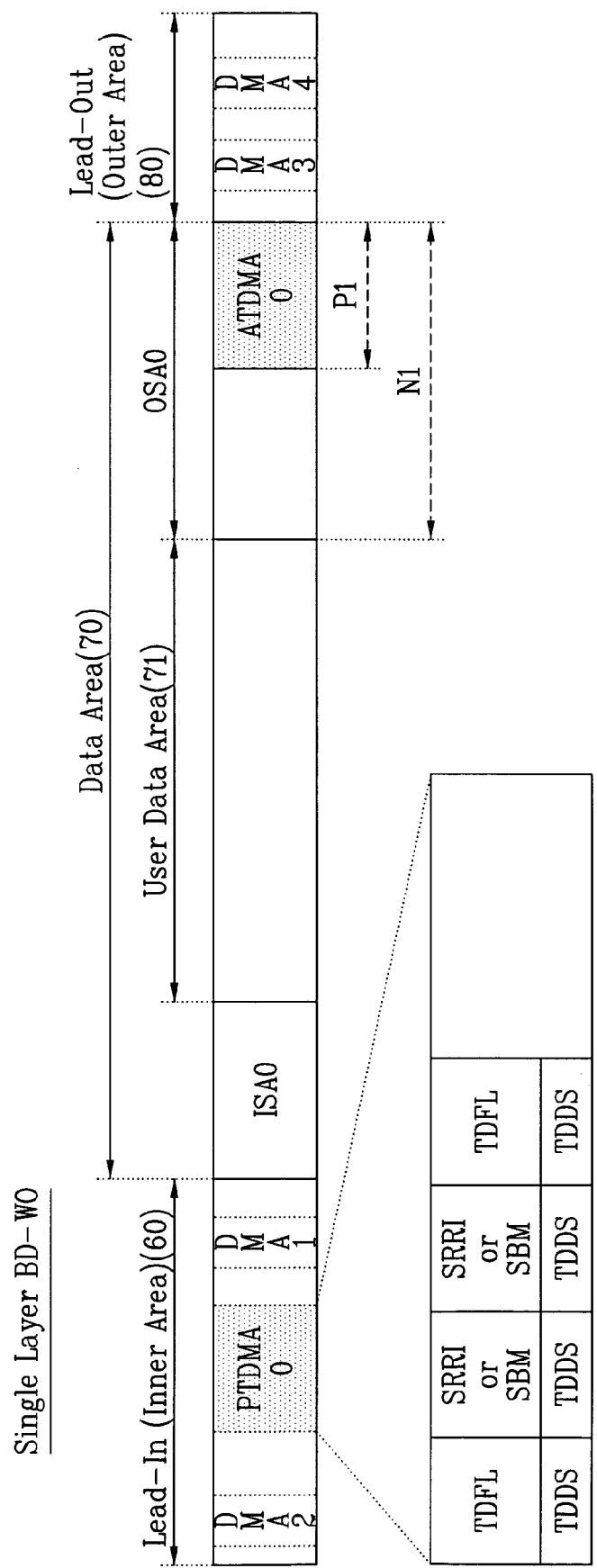
FIG. 5 is a view illustrating the structure of a single layer write-once optical disc according to an embodiment of the present invention.

The detailed description is made as below of the structure of a single layer write-once optical disc (BD-WO) as shown in FIG. 5 according to an embodiment of the present invention.

Referring to FIG. 5, the write-once optical disc has a single recording layer, which includes a lead-in area 60, a data area 70 and a lead-out area 80. The data area 70 includes an inner spare area ISA0, a user data area 71, and an outer spare area OSA0.

Since the write-once optical disc by nature has to include many areas on which a variety of management information of the disc is recorded, it includes a plurality of Temporary Defect Management Areas or Temporary Disc Management Areas (hereinafter, referred to as "TDMA"), and includes a defect management area or a disc management area (hereinafter, referred to as "DMA") for recording final management information therein when the disc is finalized. Four DMAs (DMA1~DMA4) are provided in the lead-in and lead-out areas 60 and 80 of the disc.

As aforementioned, the temporary defect management area TDMA has general management information as well as defect management information mixed and recorded therein. The general management information includes a recorded state of the disc, and the defect management information is created generally while the disc is used. If the disc is finalized, the disc is in a state in which recording (e.g., to the user data area) can be no longer made. Therefore, the management information from the TDMA is transferred to and recorded in the DMA as the final management information. Accordingly, the TDMA or DMA is used depending on whether or not the write-once optical disc is finalized.

The TDMAs are generally classified into two kinds: primary TDMA (hereinafter, referred to as "PTDMA") having a fixed size (for example, 2048 clusters) and located in the lead-in area; and additional TDMA (referred to as "ATDMA") having a variable size and located in the outer spare area (OSA0) among the spare areas of the data area. They are respectively named as the PTDMA0 and the ATDMA0 as examples in the structure of FIG. 5.

Accordingly, a temporary defect management area (TDMA) of the present invention can be a PTDMA or an ATDMA. When the terms, "primary temporary defect management area (PTDMA)" and "additional temporary defect management area (ATDMA)" are used, it should be understood that they respectively mean the PTDMA and the ATDMA.

The PTDMA0 of a fixed size (e.g., 2048 clusters) is allocated to the lead-in area 60 inevitably at an initial stage of the disc, and the ATDMA0 can be selectively allocated or may not even be allocated. At the time of allocating areas on the disc, a size (P1) of the ATDMA0 is variously determined. A specific-rated size (for example, P1=N1/4) may be appropriate in view of the size (N1) of the spare area (OSA0).

That is, the inventive write-once optical disc includes a plurality of the temporary defect management areas (TDMAs) in addition to the defect management areas (DMAs). The temporary defect management areas (TDMAs) include the PTDMA(s) allocated with a fixed size and the ATDMA(s) allocated to a specific spare area and having a variable size.

The "management information" among the terms used in the present invention is named and used to include the "defect management information" and/or the "general management information." The defect management information includes information for managing a position of a defective area and a position of a corresponding replacement area so as to manage the defective area of the disc. The general management information includes management information, except for the defect management information of the disc, and is exemplified as information and the like for distinguishing the recorded area and the un-recorded area of the disc to represent the recorded state. The write-once optical disc according to the present invention includes information for managing whether any area of the disc is a recorded area or an un-recorded area. Hereinafter, the management information according to the present invention is described in detail as below.

The same management information is recorded in the PTDMA and the ATDMA of the disc, but FIG. 5 illustrates in detail only the management information recorded in the PTDMA0 for description convenience.

Still referring to FIG. 5, the management information is mainly distinguished into three kinds. The first kind, as the defect management information, is a Temporary Defect List (TDFL) for recording a defect list to manage the defective areas of the disc. The second kind, as the general management information, is a Sequential Recording Range Information (SRRI) and a Space Bit Map (SBM) for indicating the recorded state of the disc. The third kind is a Temporary Disc Definition Structure (TDDS) including the defect management and the general management to record various necessary information of the disc.

Generally, the SRRI and the SBM are not used at the same time. If a sequential recording is used on the disc, the SRRI is recorded in the TDMA (e.g., PTDMA0, ATDMA0, etc.). But if a random recording is used on the disc, the SBM is recorded in the TDMA. Further, the management information is recorded in the TDMA whenever updating is needed. However, since the updated information should be always recorded in the TDDS, the TDDS is recorded together with the TDFL or the SRRI (or the SBM) that is always updated. Information recorded in the TDDS is exemplified as the position information and the like of the updated TDFL (or SRRI or SBM).

In case that the recording area (i.e., the user data area) of the disc no longer remains, there is no further recording to the temporary defect management area, or in case that a user no longer wants to record on the disc, the disc is finalized. At this time, the updated management information recorded at last among the management information recorded in the temporary defect management area (TDMA) is transferred to and recorded in the defect management area (DMA such as DMA1) as the final management information. The same management information is stored in each of the DMA1~DMA4, i.e., the information stored in one DMA is an exact duplicate copy of the information stored in each of the other DMAs.

Figure 6:
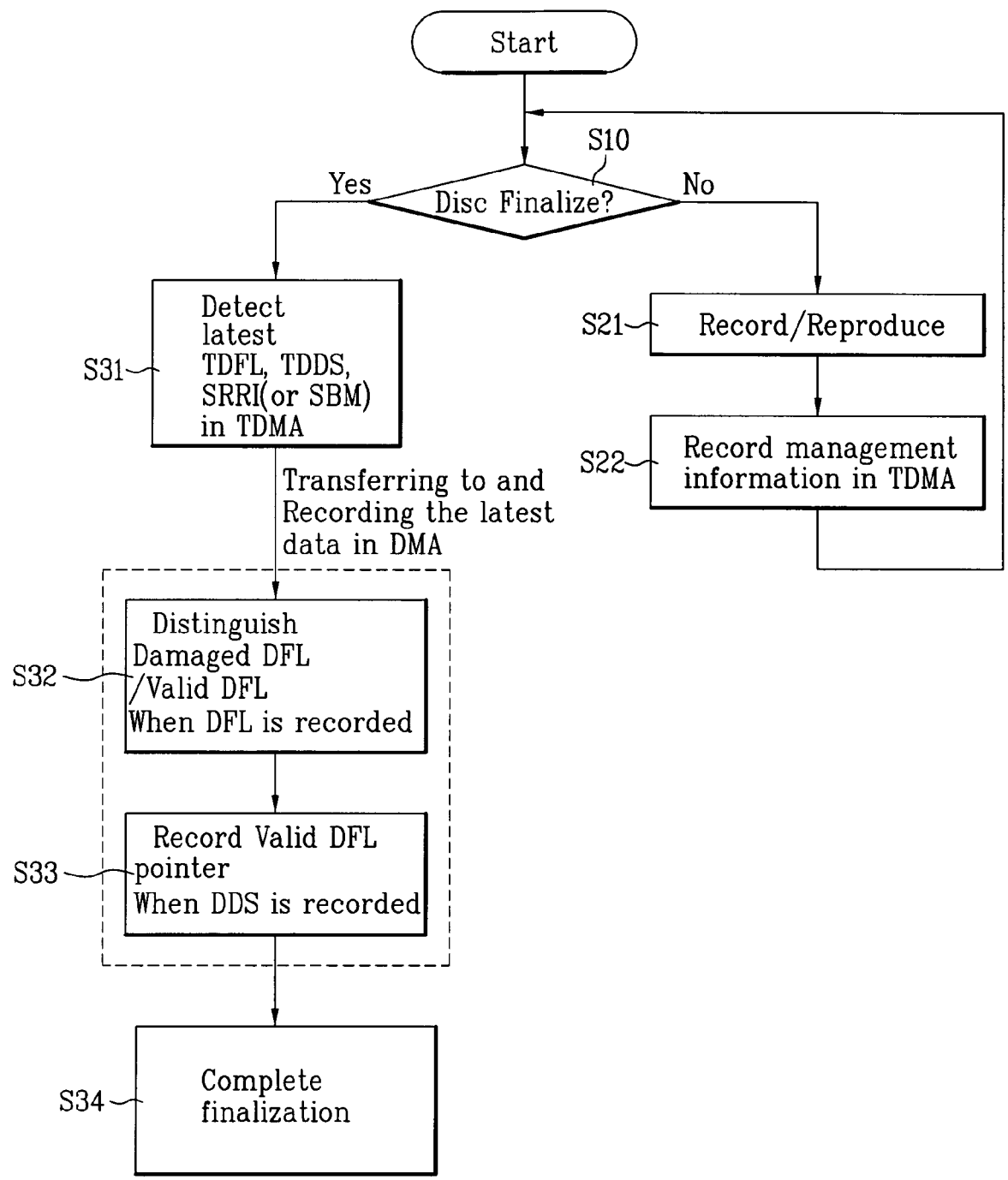
FIG. 6 is a flow chart illustrating a recording/reproducing method for a write-once optical disc according to an embodiment of the present invention.

FIG. 6 is a flow chart illustrating a recording/reproducing method for a write-once optical disc such as a BD-WO of FIG. 5 according to an embodiment of the present invention, and particularly illustrates how data is reproduced with reference to the finalized disc. It should be noted that the method of FIG. 6 is also equally applicable to BD-WOs to be discussed later in connection with FIGS. 7-11.

Referring to FIG. 6, at first, it is ascertained whether or not the disc is to be finalized while data is reproduced from the disc (S10). The disc is to be finalized, e.g., if the recording area (e.g., user data area) no longer remains on the disc, if there is no temporary defect management area, if the user no longer wants to record data on the disc, if a disc finalize command is received from the user or host, etc. If the disc is finalized, then no further recording to the user data area occurs.

In case that the disc is not to be finalized at step S10, data is validly reproduced from the disc (S21), and the generated management information is repeatedly recorded in the temporary defect management area(s) (TDMA(s))(S22).

If step S10 determines that the disc is to be finalized, the final management information is recorded in the defect management area (DMA). This process is discussed as below.

When the disc is to be finalized, the updated management information recorded at last (i.e., the latest management information) in the temporary defect management area (TDMA) is detected and verified (S31). The management information includes the TDFL, the SRRI (or SBM), the TDDS and the like as discussed above. Then the latest management information is transferred from the TDMA (e.g., PTDMA or ATDMA) to and recorded in the defect management area (e.g., DMA1 or DMA2 or DMA3 or DMA4) as the final management information of the disc. Particularly, the latest TDFL is transferred to and recorded in the DFL area of the DMA as the DFL. The latest TDDS is transferred to and recorded in the DDS area of the DMA as the DDS. The latest SRRI (or latest SBM) in the TDMA is transferred to and recorded in the SRRI (or SBM) area of the DMA. The contents of one DMA are copied into each of the other DMAs.

When the TDFL is transferred to and recorded in the DFL, it is checked whether the recorded DFL is valid or damaged (S32) such that only the position information on the valid DFL area is recorded as the position information (P_ADFL) in the DDS (S33), and after completion of the disc finalization, only reproduction operation from the disc is enabled (S34).

The process of determining whether a particular disc area is damaged or defective as in step S32 can be done using existing techniques such as by examining signal characteristics from the disc area, etc.

Figure 7:
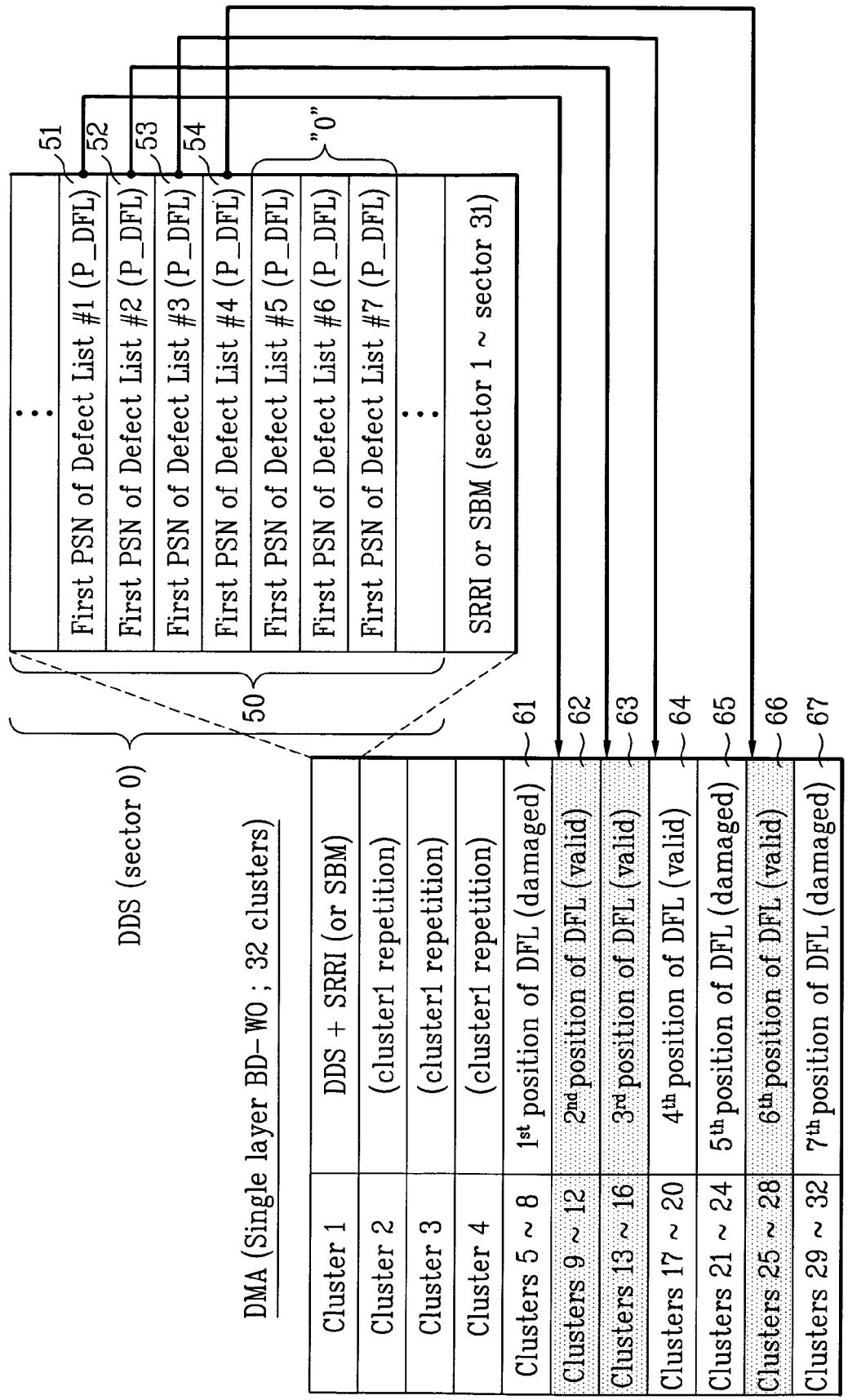
FIG. 7 is a view illustrating the structure of a DMA of the single layer write-once optical disc of FIG. 5 according to an embodiment of the present invention.
Figure 8:
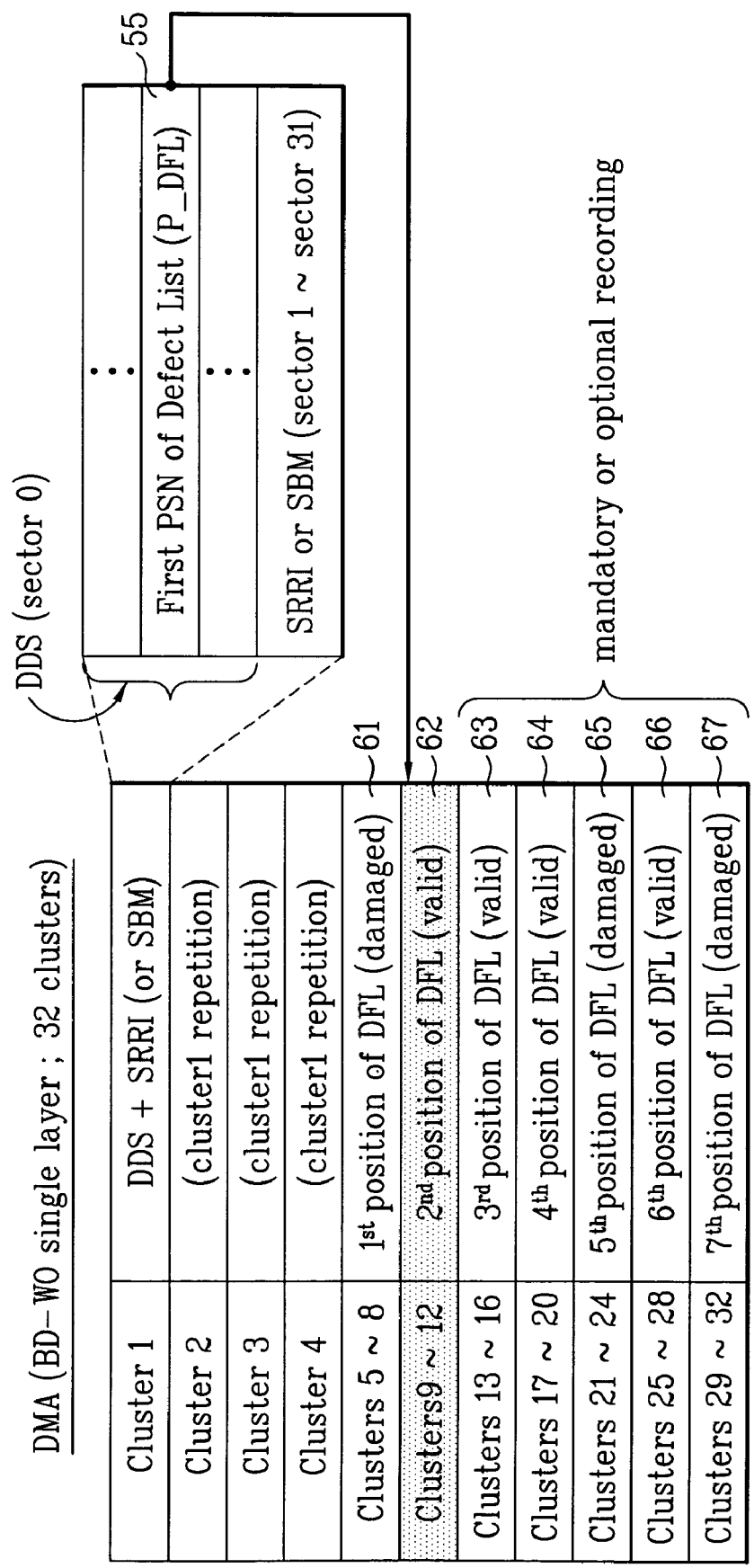
FIG. 8 is a view illustrating the structure of a DMA of the single layer write-once optical disc of FIG. 5 according to an embodiment of the present invention.

In the recording/reproducing method of FIG. 6, steps S32 and S33 of recording the final management information at the time of disc finalization are particularly described in detail by referring to FIGS. 7 and 8.

FIG. 7 is a view illustrating the structure of each DMA of the BD-WO shown in FIG. 5 according to an embodiment of the present invention. In this embodiment, the position information (P_DFL) that identifies the position or location of a valid DFL is recorded in one DDS for all valid DFLs.

Figure 1:
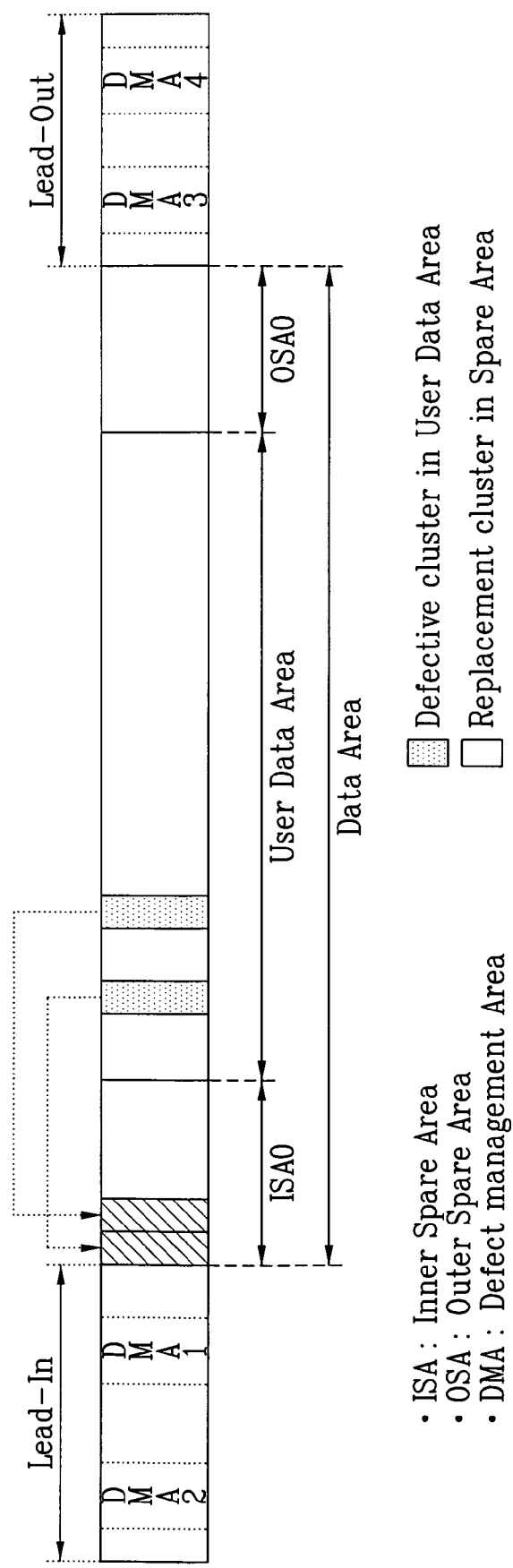
FIG. 1 is a schematic view illustrating the structure of a single layer BD-RE according to a related art.
Figure 2:
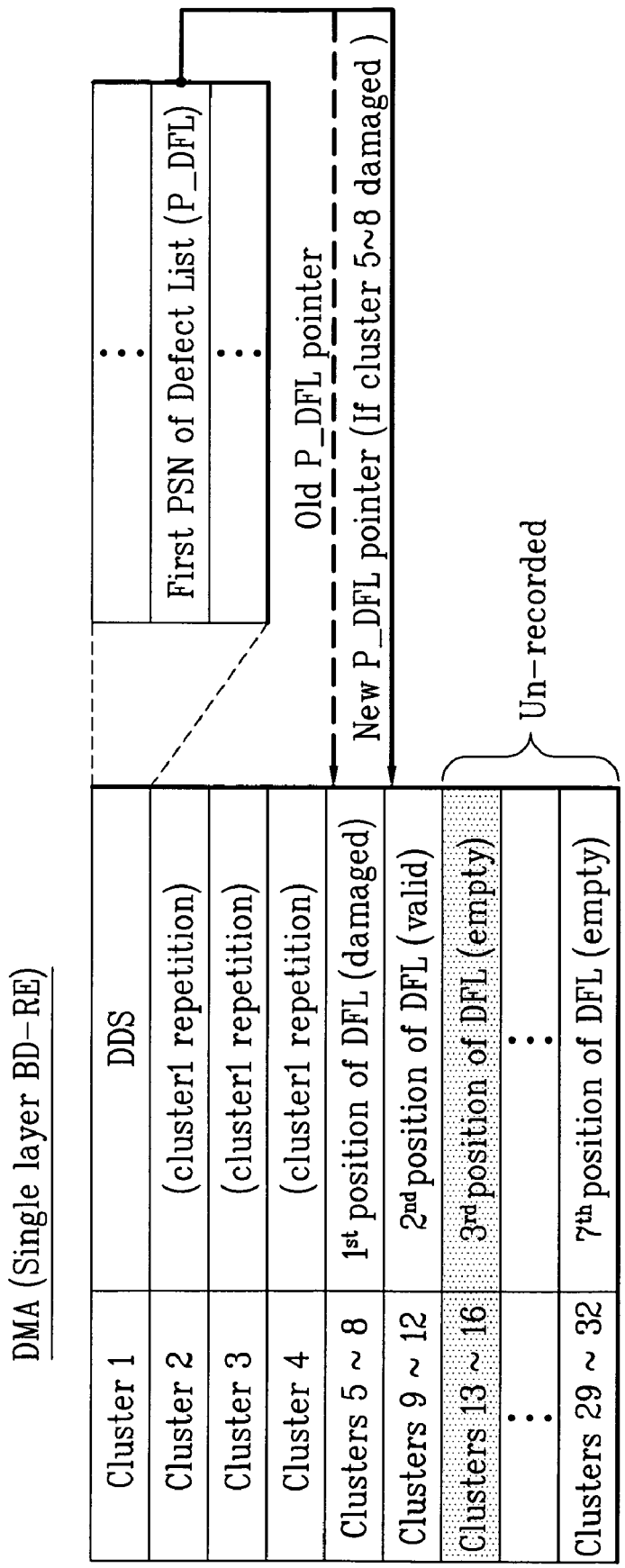
FIG. 2 is a view illustrating the structure of a DMA in the BD-RE of FIG. 1 according to a related art.
Figure 3:
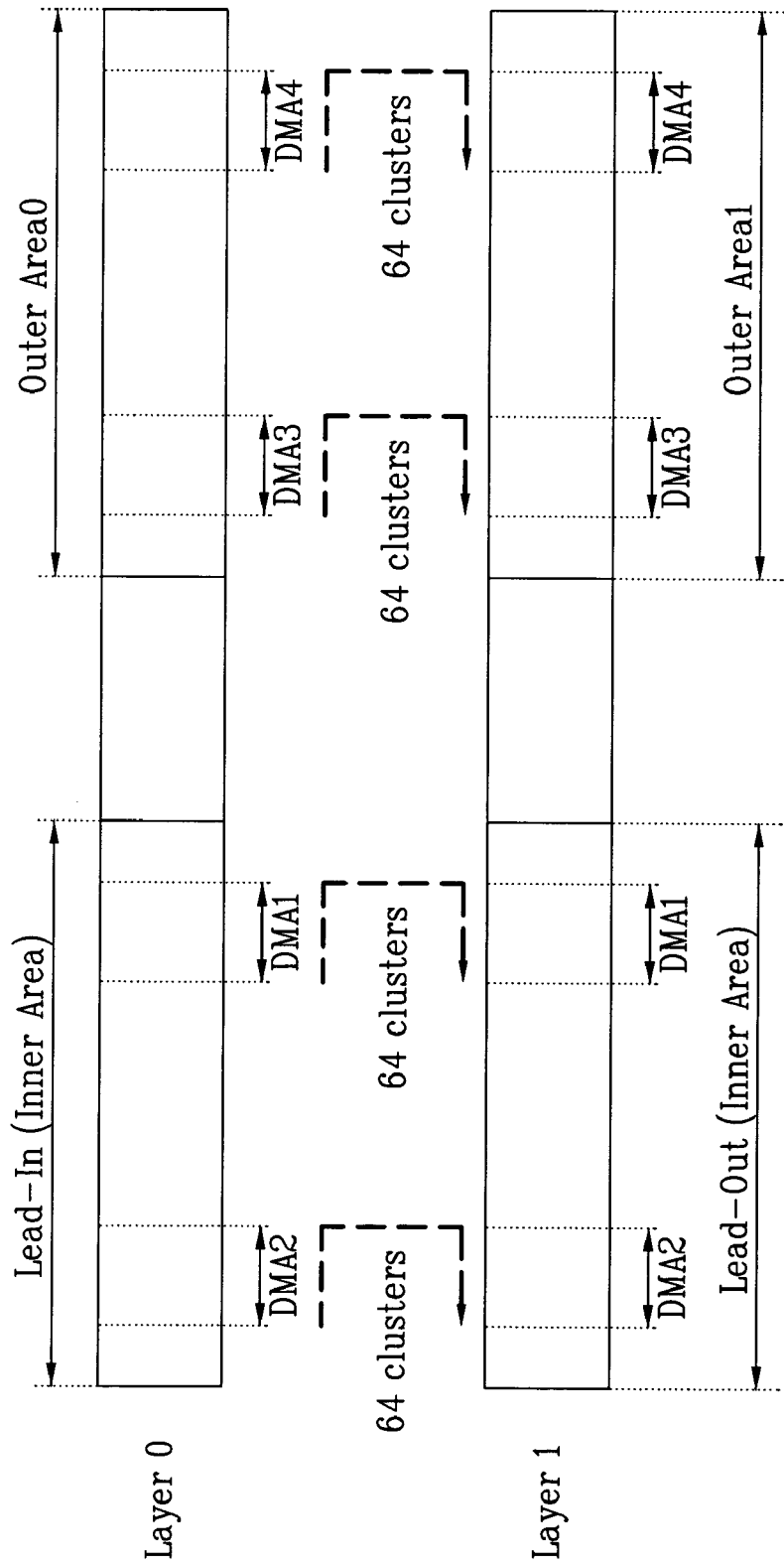
FIG. 3 is a schematic view illustrating the structure of a dual layer BD-RE according to a related art.
Figure 4:
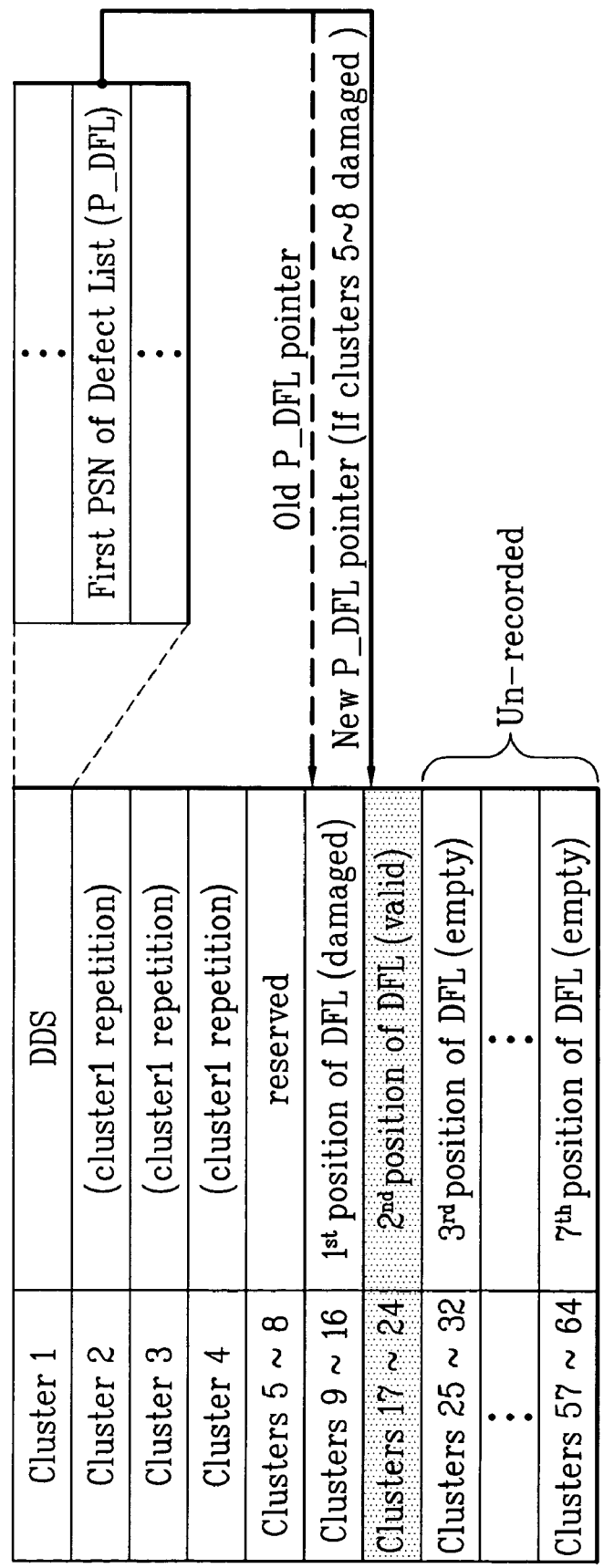
FIG. 4 is a view illustrating the structure of a DMA in the BD-RE of FIG. 3 according to a related art.

Referring to FIG. 7, the DMA has the same size (e.g, 32 clusters) at the same position of the disc such as the DMA of the BD-RE having one recording layer as shown in FIG. 2 so as to secure compatibility with the BD-RE, but the recording manner is different due to the "write-once" characteristic of the BD-WO as described below.

First of all, when the disc is to be finalized at step S10 of FIG. 6, the updated TDFL of the temporary defect management area (TDMA) is detected, transferred to and recorded in the DFL area(s) of the defect management area (DMA). The updated TDFL (latest TDFL) is repeatedly recorded for up to seven times in Clusters 5-32 of the DMA. In FIG. 7, reference numerals 61 to 67 represent the 1$^{st}$ through 7th positions of duplicated DFLs respectively. For instance, a DFL is duplicated in Clusters 5-8, in Cluster 9-12, in Clusters 13-16, in Clusters 17-20, etc. As such, these groups of clusters for recording duplicate DFLs are also referred to herein as DFL areas. For instance, Clusters 13-16 is a DFL area and Clusters 17-20 is another DFL area.

In step S32, it is checked whether or not each DFL area is defective. If the DFL area is determined not to be defective, that DFL area as recorded is defined as a valid area. If the DFL area is determined to be defective, it is defined as a damaged area. The position of each of the valid DFL areas is recorded in the DDS. FIG. 7 illustrates a case in which the $2^{nd}$, $3^{rd}$, $4^{th}$ and $6^{th}$ positions of DFL (62, 63, 64 and 66) are defined as the valid areas, and the position information on each of these valid areas is all recorded in the DDS. This can be done in different ways.

According to one way, the DFL can be recorded into a particular DFL area of the DMA. Just after recording, the system can verify whether or not the recorded DFL area is defective. If the system verifies that the recorded DFL area is not defective, then the system records the position information on this recorded DFL area to the DDS of the DMA and then the DFL is copied into the next DFL area. If the system verifies that the recorded DFL area is defective, then the position information on the recorded DFL area is not recorded in the DDS, but the DFL is copied into the next DFL area of the DMA. This process is repeated so that the same DFL may be repeatedly recorded for up to seven times into the DFL areas of the DMA.

According to another way, the DFL can be repeatedly recorded in each of the seven DFL areas and then the system can verify whether or not each of the seven DFL areas is defective. After the group verification, the position information on any valid DFL area may be recorded in the DDS.

The position information on the DFL area is also referred to as "P_DFL" or "First PSN of Defect List", and is used to indicate a particular area with a physical sector number (PSN) disposed at the head of that area. Such a use of the term is equally applied to all other embodiments of the present invention.

As shown in FIG. 7, the content of the latest TDDS is not only transferred to and recorded in the DDS of the DMA, but also the position information (P_DFL) on the valid DFLs is recorded in the DDS of the DMA. Also, the TDDS may include an area in which the position information (P_DFL) on the valid DFLs can be recorded. However, since this area of the TDDS is not needed until the disc is finalized, this area of the TDDS may be recorded initially with non-meaningful information such as "00h" or "FFh".

In the example shown in FIG. 7, Cluster 1 stores therein the DDS (latest TDDS transferred) and the latest SRRI (or SBM). The contents of Cluster 1 are repeatedly stored in each Cluster 2, Cluster 3, and Cluster 4. In one cluster such as Cluster 1, the DDS may be stored in Sector 0 and the SRRI/SBM may be stored in Sectors 1-31; or the SRRI/SBM may be stored in Sectors 0-30 and the DDS may be stored in Sector 31 of the cluster.

The DDS includes an area 50 in which total seven pieces of position information (P_DFL) can be recorded. More specifically, this area 50 stores therein a first PSN of defect list #1 through a first PSN of defect list #7. In this embodiment, the first PSNs of only the valid DFLs are stored in the area 50. In the example of FIG. 7, it is assumed that only the $2^{nd}$, $3^{rd}$, $4^{th}$ and $6^{th}$ positions of DFLs are valid so that only the position information on these valid areas is sequentially recorded in the area 50 of the DDS, and the position information on the remaining damaged DFLs is not recorded in the DDS.

For instance, the area 50 of the DDS stores therein the first PSN of Defect List #1 (51) which identifies the location (first PSN) of the valid DFL area (62) at Clusters 9-12, the first PSN of Defect List #2 (52) which identifies the location (first PSN) of the next valid DFL (63) at Clusters 13-16, the first PSN of Defect List #3 (53) which identifies the location (first PSN) of the next valid DFL (64) at Clusters 17-20, and the first PSN of Defect List #4 (54) which identifies the location (first PSN) of the next valid DFL (66) at Clusters 25-28. The location of damaged $1^{st}$, $5^{th}$ and $7^{th}$ positions of DFL (61, 65 and 67) is not stored in the DDS. Any unused portion of the area 50 can be recorded with some predetermined value such as "00h" or "FFh".

Accordingly, if all seven recorded DFL areas of the DMA are valid areas, then the location of each of the valid DFL areas is stored sequentially in the area 50 so that there exist seven pieces of position information on the DFLs in the DDS. If, for some reason, all the recorded DFL areas of the DMA are damaged areas, then the seven pieces of position information on the DFLs may be all recorded as "00h" or "FFh" in the area 50 of the DDS. In such case, since there are four defect management areas (DMAs) on the disc with the same information redundantly recorded in each of the DMAs, the valid information of the DFL can be read from other DMAs that are not damaged. As a result, the present scheme secures important management information.

As the final management information, the SRRI (or SBM) is recorded together with the DDS in the BD-WO. The BD-RE of FIG. 2 according to the related art, however, does not record the SRRI (or SBM) in the DDS as the management information and instead, non-meaningful information ("00h" or "FFh") is recorded in the remaining sectors of the cluster having the DDS.

According to the structure shown in FIG. 7, in case that the optical disc is finalized, the recording/reproducing apparatus (e.g., the device shown in FIG. 12) reads the position/location information (P_DFL) on the first valid DFL area, from the DDS of the corresponding DMA, to access the DFL at the first valid location. If the defect and the like are found at this first valid location, the apparatus reads the location information (P_DFL) on the next valid DFL area and accesses the DFL at that second valid location identified by the location information (P_DFL). This scheme compensates for a scenario when the initial valid DFL area may be damaged subsequently by a disc scratch and the like since even the valid DFL area defined at the time of disc finalization is continuously used even after the disc is finalized.

FIG. 8 is a view illustrating the structure of each DMA of the BD-WO of FIG. 5 according to another embodiment of the present invention. The structure and use of the DMA in FIG. 8 are identical to those of the DMA in FIG. 7, except for that only one position information (P_DFL) on one valid DFL area of the DMA is recorded in the DDS and that any subsequent duplicate recording of the DFL into the other DFL areas of the DMA may be optional.

More specifically, in the embodiment of FIG. 8, after the DFL is recorded at a particular DFL area of the DMA, the system verifies if the recorded DFL area of the DMA is a valid area. If it is, then the system records the position information (P_DFL) on this valid DFL area to an area 55 of the DDS. Then the process may stop. Optionally or mandatorily, the system may record the DFL in the next DFL area(s) of the DMA. But even in these cases, the position information on these next DFL area(s) is not recorded in the DDS so that only one position information remains in the DDS. In the example shown in FIG. 8, even though there are four valid positions of DFL (62, 63, 64 and 66), the position information on only the $2^{nd}$ position of DFL (i.e., the first PSN of DFL at Clusters 9-12) is recorded in the area 55 of the DDS.

As mentioned above, although the DFL can be repeatedly recorded in Clusters 5-32 for seven times, it is possible to record the DFL in such a manner that the DFL is not recorded at the remaining clusters of the DMA when the valid position of one DFL area is obtained.

As an example, the latest TDFL is transferred to and recorded in the DFL area 61 (Clusters 5 to 8) of the DMA. If it is checked that this area is a defective/damaged area, then the latest TDFL is also transferred to and recorded in the next DFL area 62 (Clusters 9 to 12) of the DMA. If this area is determined to be a non-defective/valid area, then the position information on this valid DFL area 62 is recorded in the DDS. At this time, transferring and recording of the latest TDFL at the remaining DFL areas 63-67 (Clusters 13 to 32) may not be performed. Instead, these remaining areas may be recorded as "00h", "FFh", or some other designated value/manner. The position information (51) on only one first valid DFL area 62 is stored in the DDS of the DMA.

As described above, an advantage to not transferring and not recording the latest TDFL onto all the DFL areas of the DMA is that the disc finalization can be promptly completed without undue delay since a recording time can be shorten. The reason why only one piece of position information (P_DFL) on one valid DFL area can be recorded in the DDS of the DMA is that the final management information is still well protected and can be accessed from other DMAs, as needed.

Figure 9:
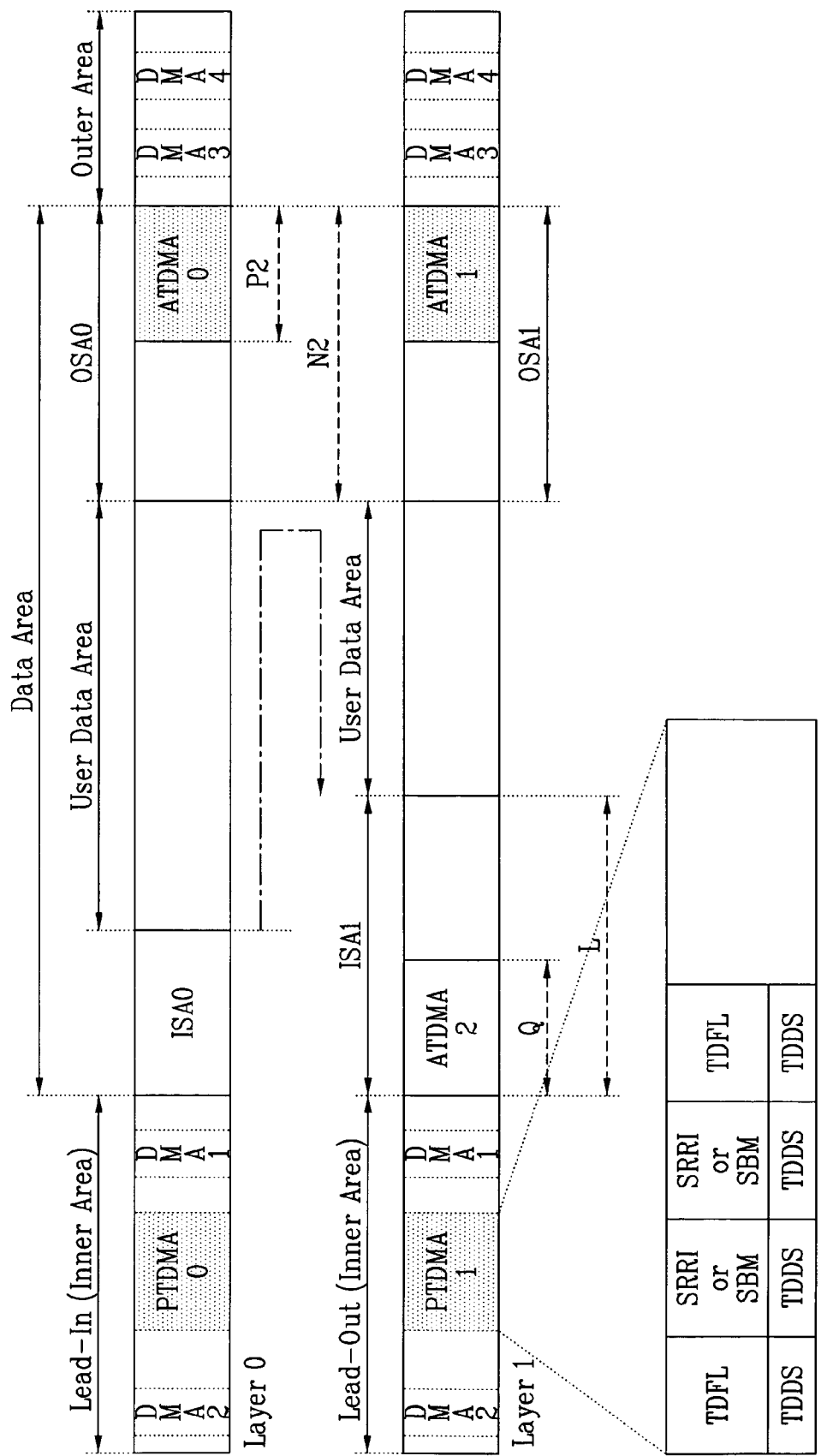
FIG. 9 is a view illustrating the structure of a dual layer write-once optical disc according to an embodiment of the present invention.
Figure 10:
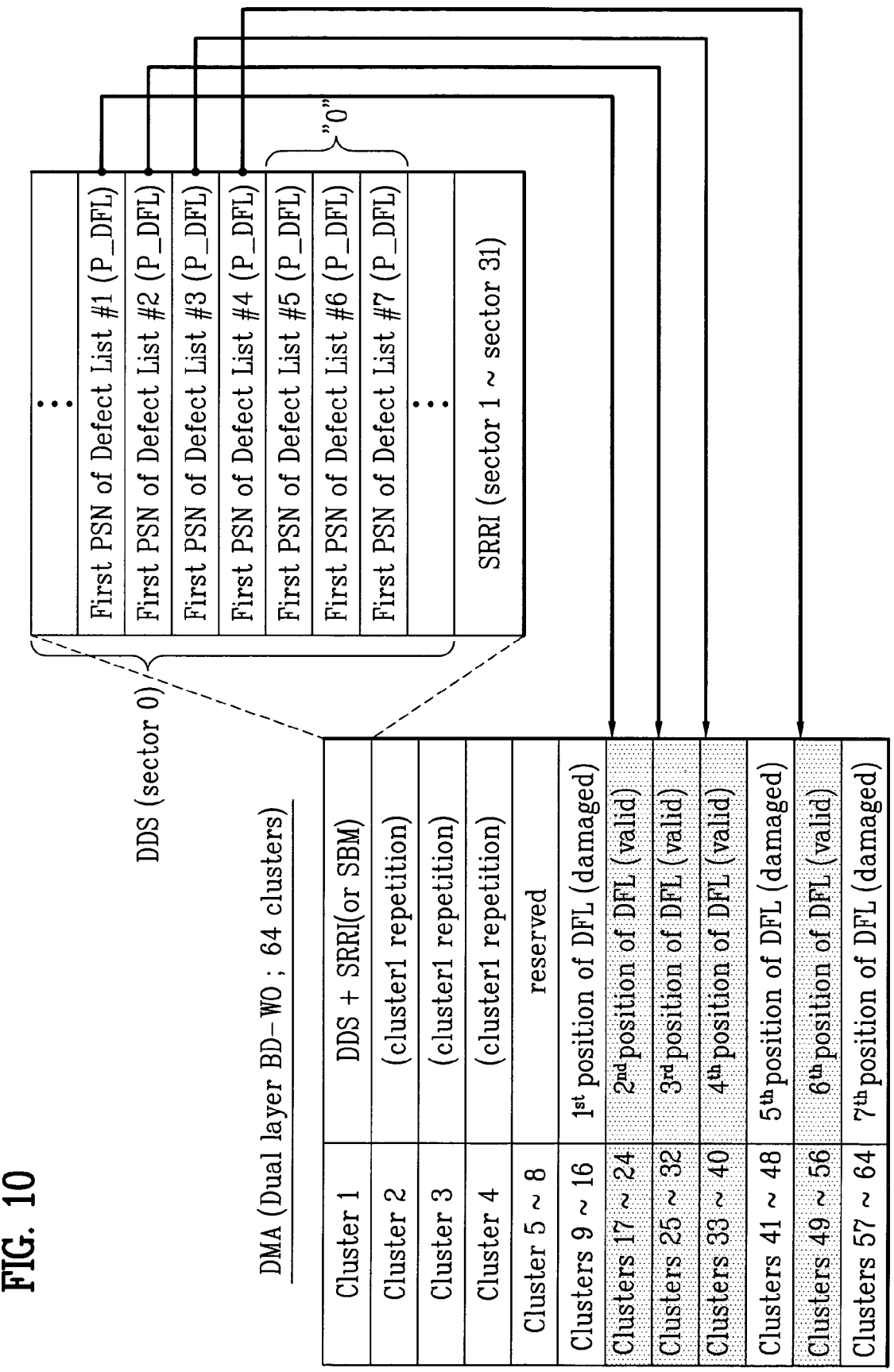
FIG. 10 is a view illustrating the structure of a DMA of the dual layer write-once optical disc of FIG. 9 according to an embodiment of the present invention.
Figure 11:
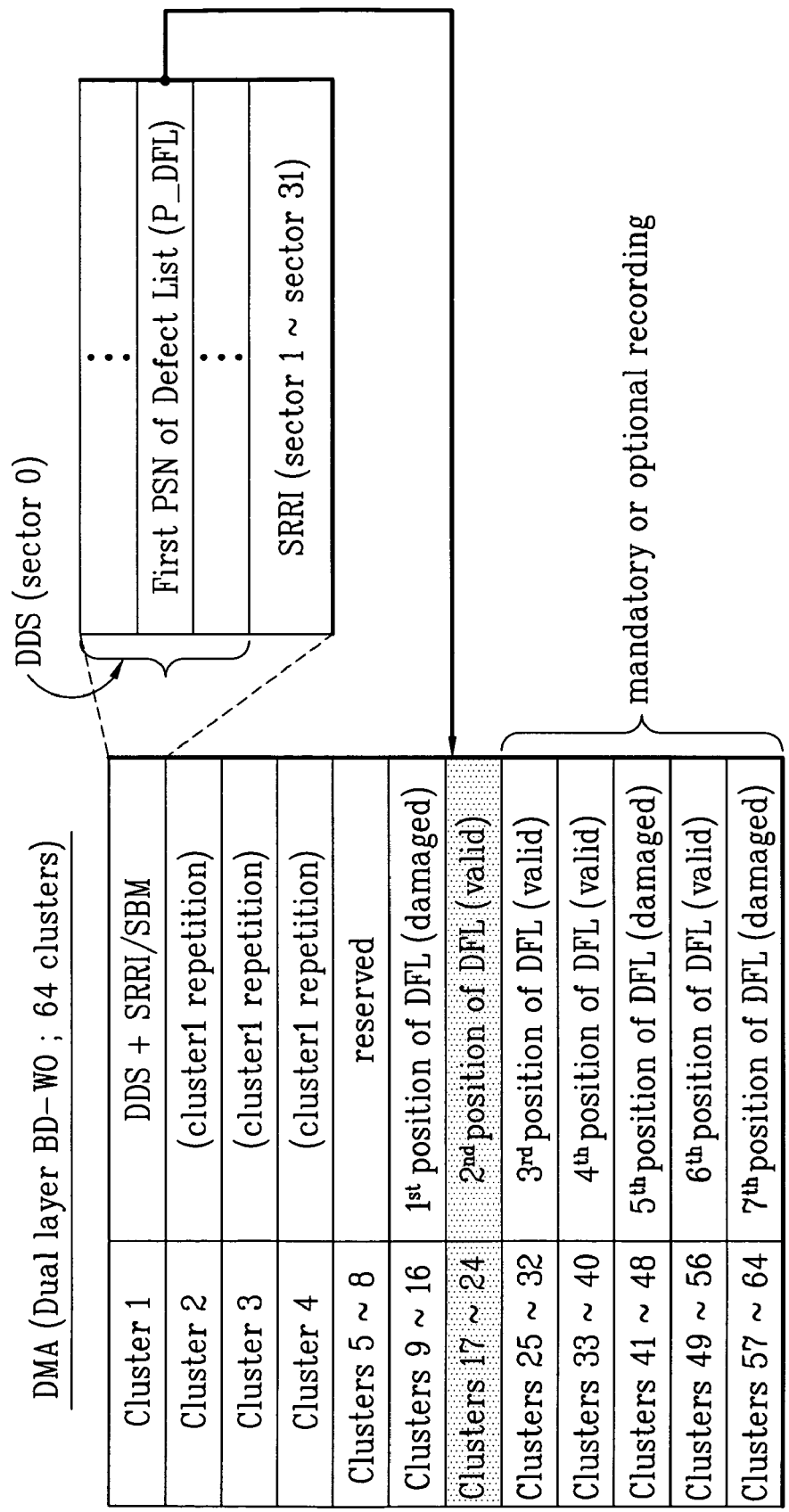
FIG. 11 is a view illustrating the structure of a DMA of the dual layer write-once optical disc of FIG. 9 according to an embodiment of the present invention.

FIGS. 9 to 11 illustrate embodiments in which the inventive concept is expanded and applied to a dual layer optical disc having two recording layers. The methods of FIG. 6 are equally applicable to the dual layer discs of FIGS. 9 to 11.

Particularly, FIG. 9 is a view illustrating the dual layer structure of a write-once optical disc such as BD-WO according to an embodiment of the present invention. The dual layer write-once optical disc includes a first recording layer (Layer 0) and a second recording layer (Layer 1) each having a lead-in area, a data area, and a lead-out area. The recording layers respectively include a PTDMA0 (Layer 0) and a PTDMA1 (Layer 1) each having a fixed size. Four spare areas can be totally allocated in the data areas. An inner spare area ISA0 and an outer spare area OSA0 can be allocated to the inner and outer peripheries of the first recording layer (Layer 0), and an inner spare area ISA1 and an outer spare area OSA1 can be allocated to the inner and outer peripheries of the second recording layer (Layer 1).

The ATDMAs may exist only within the OSA0, OSA1 and ISA1, and they are respectively named as the ATDMA0, ATDMA1 and ATDMA2. In FIG. 9, alphabets N, P, Q and L represent information representing the size of the corresponding areas. Specifically, it may be desirable that the size (P2) of each of the ATDMA0 and the ATDMA1 is approximately ¼ of the size (N2) of the OSA0/OSA1. It may be desirable that the size (Q) of the ATDMA2 is approximately ¼ of the size (L) of the ISA1. This is determined under a regulation, and it is apparent that a different size as needed can be allocated to these areas.

The same management information may be recorded in the PTDMA (PTDMA0 and PTDMA1) and the ATDMA (ATDMA0 and ATMDA1); however, FIG. 9 illustrates only the management information recorded in the PTDMA1 for description convenience. The management information recorded in each of these PTDMA/ATMDA includes the TDFL, the TDDS, the SRRI (or the SBM) and the like as discussed above in connection with the single layer disc structure.

Similar to the single layer disc structure, in the dual layer disc structure according to the present invention, a disc is finalized, e.g., if a recording area no longer remains on the disc, if there is no temporary defect management area, or if a user no longer wants recording on the disc. At this time, the latest updated management information recorded in the temporary defect management area is transferred to and recorded in the defect management area (DMA) as the final management information as discussed above.

FIG. 10 is a view illustrating the structure of each DMA in the dual layer disc of FIG. 9 according to an embodiment of the present invention. The DMA structure and use of the dual layer disc in FIG. 10 are identical to those of the single layer disc in FIG. 7, except for that the size of the DMA is 64 clusters, Clusters 5-8 are reserved and each DFL is recorded in the DMA within 8 clusters (instead of 4 clusters in the single layer disc). Accordingly, the position information on all the valid DFLs is recorded in the DDS of the DMA as shown in FIG. 10.

FIG. 11 is a view illustrating the structure of each DMA in the dual layer disc of FIG. 9 according to another embodiment of the present invention. The DMA structure and use of the dual layer disc in FIG. 11 are identical to those of the single layer disc in FIG. 8, except for that the size of the DMA is 64 clusters, Clusters 5-8 are reserved and each DFL is recorded in the DMA within 8 clusters (instead of 4 clusters in the single layer disc). Accordingly, the position information on only the first valid DFL is recorded in the DDS of the DMA as shown in FIG. 11.

As discussed above, although it is possible to record the DFL repeatedly for seven times in the DMA at Clusters 9-16 as shown in FIG. 11, it is also possible to stop recording of the DFL once one valid DFL is recorded in the DMA. That is, the process of recording the DFL repeatedly after a valid DFL is once recorded can be an optional or mandatory feature according to the present invention. This optional/mandatory recording of the subsequent DFLs to the DMA was discussed above in connection with FIG. 8.

Figure 12:
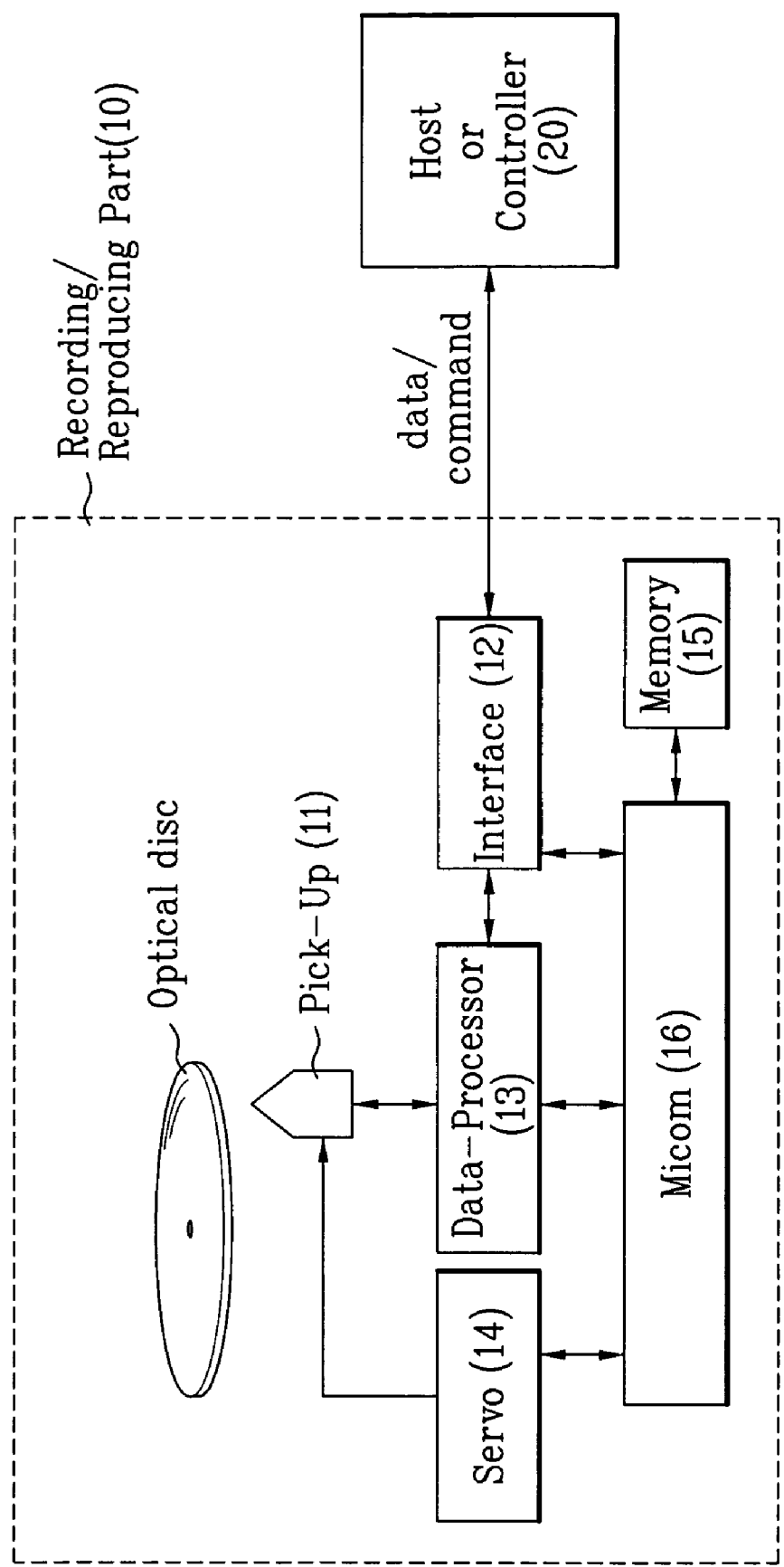
FIG. 12 is a view illustrating a recording/reproducing apparatus for a write-once optical disc according to the present invention.

FIG. 12 is a view illustrating a recording/reproducing apparatus in which the present methods can be implemented. The methods according to the present invention can also be implemented using other devices or systems.

Referring to FIG. 12, the recording/reproducing apparatus includes a recording/reproducing part 10 for performing recording/reproducing to/from a write-once optical disc such as a BD-WO, and a control part 20 for controlling the recording/reproducing operations. The control part 20 sends a record command or a reproduction command for a specific area on the disc to the recording/reproducing part 10. The recording/reproducing part 10 performs the recording/reproducing at the specific area depending on the command of the control part 20. The recording/reproducing part 10 can include an interface unit 12 for allowing communication with external devices; a pickup unit 11 for recording or reproducing to/from the optical disc; a data processor 13 for receiving a reproduction signal from the pickup unit 11 to restore it into a desired signal value, or for modulating a to-be-recorded signal into a signal adapted to be recorded on the optical disc for transmission; a servo unit 14 for controlling the pickup unit 11 so as to read accurately from a particular area on the optical disc, or to record accurately a signal to a particular area on the optical disc; a memory 15 for temporarily storing various information having the management information and data; and a microcomputer or processor (micom) 16 for controlling the structural elements of the recording/reproducing part 10. All the components of the recording/reproducing apparatus are operatively coupled.

In case that the inventive optical disc having the management information recorded thereon is loaded in the recording/reproducing apparatus of FIG. 12, a recording/reproducing method for the optical disc using the recording/reproducing apparatus is in detail described as below.

The recording/reproducing apparatus of FIG. 12 can record the defect management information to the disc as discussed above. For instance, the micom 16 can control the pick-up unit 11 to record the defect management information to the TDMA and DMA of the disc according to the disc structures and use discussed above.

If the optical disc is loaded into the recording/reproducing apparatus, the micom 16 of the recording/reproducing part 10 ascertains the management area of the loaded optical disc. First of all, the defect management area (DMA) is ascertained to check whether or not the corresponding disc is a finalized disc. For instance, if information is recorded in the defect management area (DMA), the corresponding disc is determined to be a finalized disc, but if no information is recorded in the defect management area (DMA), the corresponding disc is determined to be a non-finalized disc.

If the disc is determined to be a finalized disc, it is a case where the final management information of the disc is recorded in the defect management area (DMA). Therefore, the final management information is obtained from the defect management area (DMA) to be used for reproducing the disc. In this regard, the position information on the valid DFL area is quickly obtained from the DDS of the DMA. The DFL is then accessed and reproduced from the position indicated by the obtained position information, and the reproduced DFL information is again checked. If it is determined due to the checking result, that the DFL recorded in the valid area is thereafter changed into a defective damaged area, then the non-defective DFL is obtained by obtaining the position information (P_DFL) on the next valid DFL area storing the DFL if the plurality of position information (P_DFL) are recorded in one DMA as in the case of FIG. 7 or 10. Other DMAs can be accessed to obtain the non-defective DFL in case that only one piece of position information (P_DFL) is recorded in one DMA as in FIG. 8 or 11.

As other final management information, the DDS, the SRRI and the like are effectively obtained from the DMA. Similarly, if a particular area of the DMA is determined to be defective, then the next area where recording is repeatedly made can be checked to obtain the non-defective final management information.

If the disc loaded in the apparatus is a non-finalized disc, it is a case where the current management information of the disc is recorded in the temporary defect management area (TDMA). Therefore, in this case, the updated management information recorded at last (i.e., the latest management information) in the temporary defect management area (TDMA) is obtained to read a final recorded state of the disc. This makes it possible to perform an effective recording/reproducing on the write-once optical disc. In case that the updating of the management information is required while the recording/reproducing is performed or after the recording/reproducing is completed, and the disc is not yet finalized, the updated management information is recorded. In case that the disc finalization is required, the final management information at the time of the disc finalization is recorded in the defect management area (DMA) according to the methods of the present invention.

As described above, the present invention has an advantage in that effective recording/reproducing can be achieved for a write-once optical disc by providing various methods for recording the position information (P_DFL) on valid DFL(s) when the final management information is recorded in the defect management area (DMA) of the write-once optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording management information on a recording medium, the recording medium including a first management area being used before finalizing the recording medium and a second management area being used after finalizing the recording medium, the method comprising steps of:
   (a) updating management information and recording the updated management information into the first management area, and recording temporary disc definition structure (TDDS) which includes first position information on the updated management information recorded in the first management area and non-meaningful information as second position information on a valid defect list; and
   (b) recording latest management information recorded in the first management area into the second management area as final management information when the recording medium is to be finalized, the final management information including at least one defect list and record state information of the recording medium,
   wherein the recording step includes:
      storing, in the second management area, third position information on at least one valid defect list from among the at least one defect list recorded in the second management area.

2. The method of claim 1, wherein the third position information indicates only a position of a first valid defect list from among the at least one defect list recorded in the second management area.

3. The method of claim 1, wherein
   the information recorded in the first management area includes temporary disc definition structure (TDDS) information which has 00h or FFh stored as the non-meaningful information at a place corresponding to the second position information.

4. The method of claim 1, wherein the third position information includes a first physical sector number of each of the at least one valid defect list.

5. The method of claim 1, wherein the step of (b) is repeated for up to seven times per second management area of the recording medium.

6. The method of claim 1, wherein the step of (b) records one of a Sequential Recording Range Information (SRRI) and a Space Bit Map (SBM) as the record state information.

7. A optical disc, comprising:
   at least one recording layer; and
   a first management area being used before finalizing the optical disc and a second management area being used after finalizing the optical disc on the at least one recording layer,
   wherein the first management area stores therein management information and temporary disc definition structure (TDDS) which includes first position information on updated management information recorded in the first management area and non-meaningful information as second position information on a valid defect list,
   the second management area stores therein latest management information recorded in the first management area as part of final management information when the optical disc is finalized, and
   the final management information includes at least one defect list, record state information of the optical disc, and third position information on at least one valid defect list from among the at least one defect list recorded in the second management area.

8. The optical disc of claim 7, wherein the third position information indicates only a position of a first valid defect list from among the at least one defect list recorded in the second management area.

9. The optical disc of claim 8, wherein the third position information is a first physical sector number of the first valid defect list.

10. The optical disc of claim 7, wherein the second management area includes:
a first area for storing therein the third position information along with the record state information; and
a plurality of second areas each for optionally storing a defect list.

11. The optical disc of claim 7, wherein
the first management area stores therein 00h or FFh as the non-meaningful information at a place corresponding to the second position information.

12. The optical disc of claim 7, wherein the third position information includes a first physical sector number of each of the at least one valid defect list.

13. The optical disc of claim 7, wherein the second management information includes:
a first area for storing therein the third position information along with the record state information; and
a plurality of second areas each for storing a copy of a defect list.

14. The recording medium of claim 7, wherein the second management area stores therein one of a Sequential Recording Range Information (SRRI) and a Space Bit Map (SBM) as the record state information.

15. An apparatus for recording final management information on a recording medium, the recording medium including a first management area being used before finalizing the recording medium and a second management area being used after finalizing the recording medium, the apparatus comprising:
an optical pickup configured to record data on the recording medium; and
a microcomputer operatively coupled to the optical pickup and configured to update management information and control the optical pickup to record the undated management information into the first management area,
control the optical pickup to record temporary disc definition structure (TDDS) into the first management area, the temporary disc definition structure (TDDS) including first position information on the updated management information recorded in the first management area and non-meaningful information as second position information on a valid defect list,
control the optical pickup to record latest management information recorded in the first management information into the second management information as part of final management information when the recording medium is to be finalized, and
control the optical pickup to record at least one defect list, record state information, and third position information on at least one valid defect list from among the at least one defect list recorded in the second management area as the final management information.

16. The apparatus of claim 15, wherein the microcomputer is configured to control the optical pickup to record information that indicates only a position of first valid defect list from among the at least one defect list recorded in the second management area as the third position information.

17. The apparatus of claim 15, wherein the microcomputer is configured to control the optical pickup to record the third position information as part of disc definition structure (DDS) information within the final management information.

18. The apparatus of claim 15, wherein the microcomputer is configured to control the optical pickup to record a first physical sector number of the first valid defect list as the third position information.

19. The apparatus of claim 15, wherein the microcomputer is configured to control the optical pickup to record one of space bitmap information (SBM) and sequential recording range information (SRRI) as the record state information.

20. The apparatus of claim 15, wherein the microcomputer is configured to
control the optical pickup to record a defect list into one of defect list areas of the second management area,
verify if the recorded defect list area is defective, and
control the optical pickup to record, into the recording medium, position information on the recorded defect list area as the third position information if the recorded defect list area is not defective.

21. The apparatus of claim 20, wherein the microcomputer is configured to control the optical pickup to record the defect list into each of next available defect list areas of the second management area.

22. The apparatus of claim 20, wherein the microcomputer is configured to control the optical pickup to fill up remaining defect list areas with designated information.

23. The apparatus of claim 20, wherein the recording medium has seven defect list areas per second management area of the recording medium.

24. The apparatus of claim 15, wherein
the microcomputer is configured to control the optical pickup to record 00h or FFh as the non-meaningful information at a place corresponding to the second position information.

25. The apparatus of claim 15, wherein the microcomputer is configured to control the pickup to record, as the second position information, a first physical sector number of each of the at least one valid defect list into the second management area.

26. A method of reproducing data from a recording medium, the recording medium including a first management area being used before finalizing the recording medium and a second management area being used after finalizing the recording medium, the method comprising steps of:
reading management information from the first management area based on temporary disc definition structure (TDDS) before the recording medium is finalized, the temporary disc definition structure (TDDS) including first position information on the management, information updated and recorded in the first management area and non-meaningful information as second position information on a valid defect list, and reproducing data from the recording medium based on the management information; and
reading at least one valid defect list from among the final defect management information recorded in the second management information based on third position information of at least one valid defect list, the final management information including at least one defect list and record state information of the recording medium after the recording medium is finalized, and reproducing data from the recording medium based on the at least one valid defect list and the record state information.

27. The method of claim 26, wherein the record state information is one of a Sequential Recording Range Information (SRRI) and a Space Bit Map (SBM).

28. The method of claim 26, wherein the first management area stores therein 00h or FFh as the non-meaningful information at a place corresponding to the second position information, and the third position information includes a first physical sector number of a first valid defect list recorded in the second management area.

29. The apparatus of claim 26, wherein the non-meaningful information read at a place corresponding to the second position information by the optical pickup is 00h or FFh, and the third position information read by the optical pickup is a first physical sector number of a first valid defect list recorded in the second management area.

30. An apparatus for reproducing data from a recording medium, the recording medium including a first management area being used before finalizing the recording medium and a second management area being used after finalizing the recording medium, the apparatus comprising:

an optical pickup to read data from the recording medium; and a microcomputer operatively coupled to the optical pickup and configured to control the pickup to read management information from the first management area based on temporary disc definition structure (TDDS) before the recording medium is finalized, the temporary disc definition structure (TDDS) including first position information on the management information updated and recorded in the first management area and non-meaningful information as second position information on a valid defect list, control the optical pickup to reproduce data from the recording medium based on the management information, control the optical pickup to read at least one valid defect list from among the final defect management information recorded in the second management information based on third position information of at least one valid defect list, the final management information including at least one defect list and record state information of the recording medium, and control the optical pickup to reproduce data from the recording medium based on the at least one valid defect list and the record state information.

31. The apparatus of claim 30, wherein the microcomputer is configured to control the pickup to read one of a Sequential Recording Range Information (SRRI) and a Space Bit Map (SBM) as the record state information from the recording medium.

* * * * *